United States Patent
Trattner et al.

[11] Patent Number: 6,004,135
[45] Date of Patent: Dec. 21, 1999

[54] READING TUTOR

[75] Inventors: Burt Trattner, Ringwood, N.J.; Joseph Truchsess, Ridgefield, Conn.

[73] Assignee: Pragmatic Designs, Inc., Port Chester, N.Y.

[21] Appl. No.: 09/186,796

[22] Filed: Nov. 5, 1998

Related U.S. Application Data

[60] Provisional application No. 60/097,068, Aug. 19, 1998.

[51] Int. Cl.[6] .................................................... G09B 5/00
[52] U.S. Cl. ......................... 434/169; 434/156; 434/178
[58] Field of Search ................................ 434/169, 176, 434/178

[56] References Cited

U.S. PATENT DOCUMENTS

| | | | |
|---|---|---|---|
| 3,729,836 | 5/1973 | Mayeda | 434/169 |
| 4,197,661 | 4/1980 | Cook et al. | 35/35 |
| 4,337,375 | 6/1982 | Freeman | 179/1 |
| 4,358,278 | 11/1982 | Goldfarb | 434/169 |
| 4,439,160 | 3/1984 | Krempel | 434/170 |
| 4,439,757 | 3/1984 | Gross | 434/176 |
| 4,505,682 | 3/1985 | Thompson | 434/335 |
| 4,549,867 | 10/1985 | Dittakavi | 434/337 |
| 4,579,533 | 4/1986 | Anderson et al. | 434/157 |
| 4,602,152 | 7/1986 | Dittakavi | 235/463 |
| 4,752,230 | 6/1988 | Shimizu | 434/317 |
| 5,114,346 | 5/1992 | Fioramonti | 434/184 |
| 5,480,306 | 1/1996 | Liu | 434/156 |
| 5,511,980 | 4/1996 | Wood | 434/169 |
| 5,538,430 | 7/1996 | Smith et al. | 434/178 |

*Primary Examiner*—Kien T. Nguyen
*Attorney, Agent, or Firm*—Cohen, Pontani, Lieberman & Pavane

[57] ABSTRACT

An apparatus and a method for assisting a child to read a book having at least one visual indicia displayed adjacent one or more of the plurality of printed objects. Each of the at least one visual indicia is uniquely associated with the adjacent one of the plurality of printed objects. The device includes a user input device separate from the book having at least one touch-sensitive switch and at least one visual indicia displayed thereon for receiving a user command indicative of a user's selection of a visual indicia and for outputting a signal corresponding to the selected visual indicia. The device further includes a storage device for storing data representing speech associated with the printed objects adjacent the visual indicia. A controller receives the signal outputted from the user input device and selectively retrieves the data corresponding to the selected visual indicia. A sound generator then converts the retrieved data into speech.

15 Claims, 6 Drawing Sheets

READING TUTOR

CROSS REFERENCE

This application claims the benefit of a prior-filed co-pending provisional application, Ser. No. 60/097,068, that was filed on Aug. 19, 1998.

BACKGROUND OF THE INVENTION

1. Field of the Invention

The present invention relates generally to electronic devices for assisting a preschooler to read, and in particular, an apparatus and a method for enunciating and/or verbally explaining a word, phrase or any select portion of a book.

2. Description of the Related Art

It is known that children's books having electronic sound generating devices can entertain as well as captivate the interest of a child. One such electronic book has a strip disposed along an edge of a book and a plurality of touch-sensitive pads arranged along the strip. Each of the pads corresponds to a particular sound effect and has a graphic picture printed thereon. These same pictures also appear in the text of the book, such as in the middle or at the end of a sentence, for prompting the child to press the pad on the strip to thereby generate the intended sound effect for the story being read. Although they are entertaining, such books do not teach children how to pronounce letters, words, or phrases and thus require an adult to read along with the child.

U.S. Pat. No. 5,538,430 to Smith et al. discloses a self-reading child's book having an electronic sound generating device and a light-emitting diode (LED) under each word. These LEDs are automatically and sequentially illuminated as the child activates a switch associated with each LED so that the sound generating device enunciates the words in sequence. The disclosed electronic book is costly to manufacture as it requires an array of electronic devices to be incorporated into each page of the book.

Thus, there is a need for a low-cost reading tutor device for use with a conventional book, and which is both easy and fun to use by beginning readers, particularly, preschoolers.

SUMMARY OF THE INVENTION

An object of the present invention is to provide an electronic reading tutor for helping a child to learn to read without the assistance of others.

Another object of the invention is to provide an electronic reading tutor for enunciating or verbally explaining a select portion of the text of a book and which is readily operable by a preschooler.

Still another object of the invention is to provide an electronic reading tutor which does not require a book containing electronic devices which would otherwise add complexity and cost to the production of the book.

In accordance with an embodiment of the present invention, a child's book is printed with at least one visual indicia such as, for example, a single colored dot or a sequence of multi-colored dots and/or geometric shapes printed or displayed adjacent a printed object which may, for example, be a letter, a word, or a phrase, of which a child may desire enunciation and/or a verbal description or explanation. The sequence of each group of dots or shapes is selected so that it is uniquely associated with the letter, word, or phrase to which it is adjacent.

This embodiment also includes an input key pad with touch-sensitive keys or switches. Each of the keys displays the same color and/or shape as that of the colored dots or shapes printed in the book. When a reader cannot recognize a word or phrase, or wants an explanation of it, he selectively presses the color-coded or shape-coded keys (e.g., "red-blue-green) of the electronic reading tutor in the sequence corresponding to that of the group of colored dots or shapes printed proximate that phrase or word. The electronic reading tutor then enunciates the unrecognized word or phrase and/or provides a definition of it.

According to one aspect of the invention, the electronic reading tutor includes one or more integrated circuits which compare the keys entered by the user to a stored database containing a list of the sequences of colored dots or shapes used in the accompanying book. In the database, each of the sequences of colored dots or shapes is linked to a single audio signal file. Each audio signal file contains data that cause a speaker to generate sound to simulate the speaking of the word or phrase associated with the sequence of colored dots or shapes. Thus, in response to a user's keyed data entry, the electronic reading tutor enunciates the unrecognized word or phrase associated with the sequence of colored dots or shapes printed in the book. Alternatively, or additionally, the electronic reading tutor will generate an audible message explaining the word, phrase or any select portion of the book.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1A:
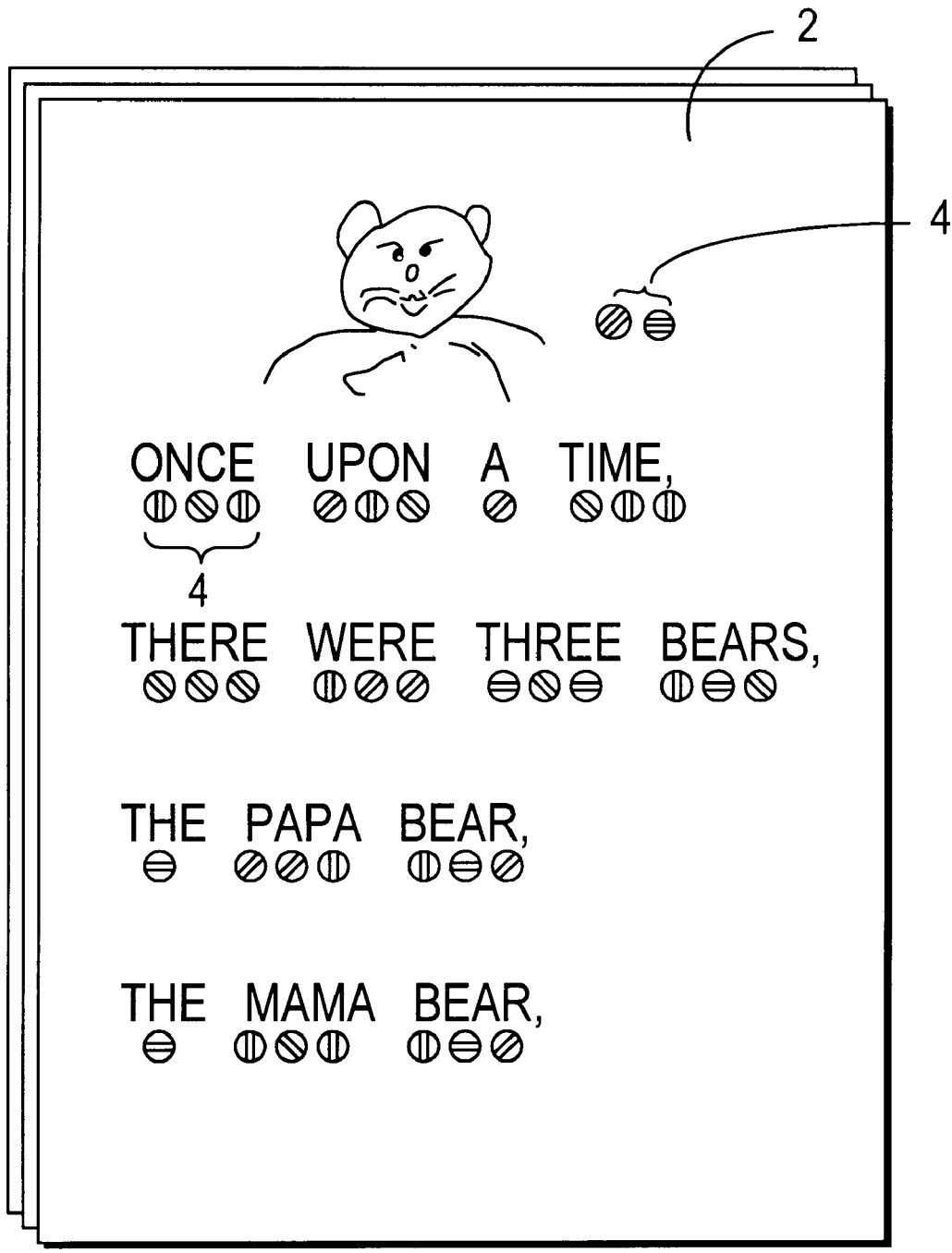
FIG. 1A depicts a single page of a child's book in accordance with a first embodiment of the present invention.

Referring now to the drawings, and initially to FIG. 1A, there is shown a single page of a child's book 2 in accordance with a preferred embodiment of the present invention. As illustrated, displayed below each word of this page is a visual indicia such as, for example, a sequence of printed colored circles 4. The sequence of colored circles is selected so that each word can be uniquely identified therewith. The sequence may vary in terms of the number of component colors and/or the number of circles. Thus, as shown in FIG. 1A, the visual indicia for the word "Once" is formed of a sequence of three circles; the word "and," two circles; and the word "the," one circle. For another example, although not shown, the visual indicia for the word "There" may be represented by a sequence of three colored circles, red-red-green; the word "were," red-green-red; the word "three," green-red-red.

Although in the embodiment shown in FIG. 1A each visual indicia is formed of three colored circles, more colored circles and/or more colors may be used, that is four or more circles, to thereby increase the number of possible combinations and the available dictionary of words.

Figure 2A:
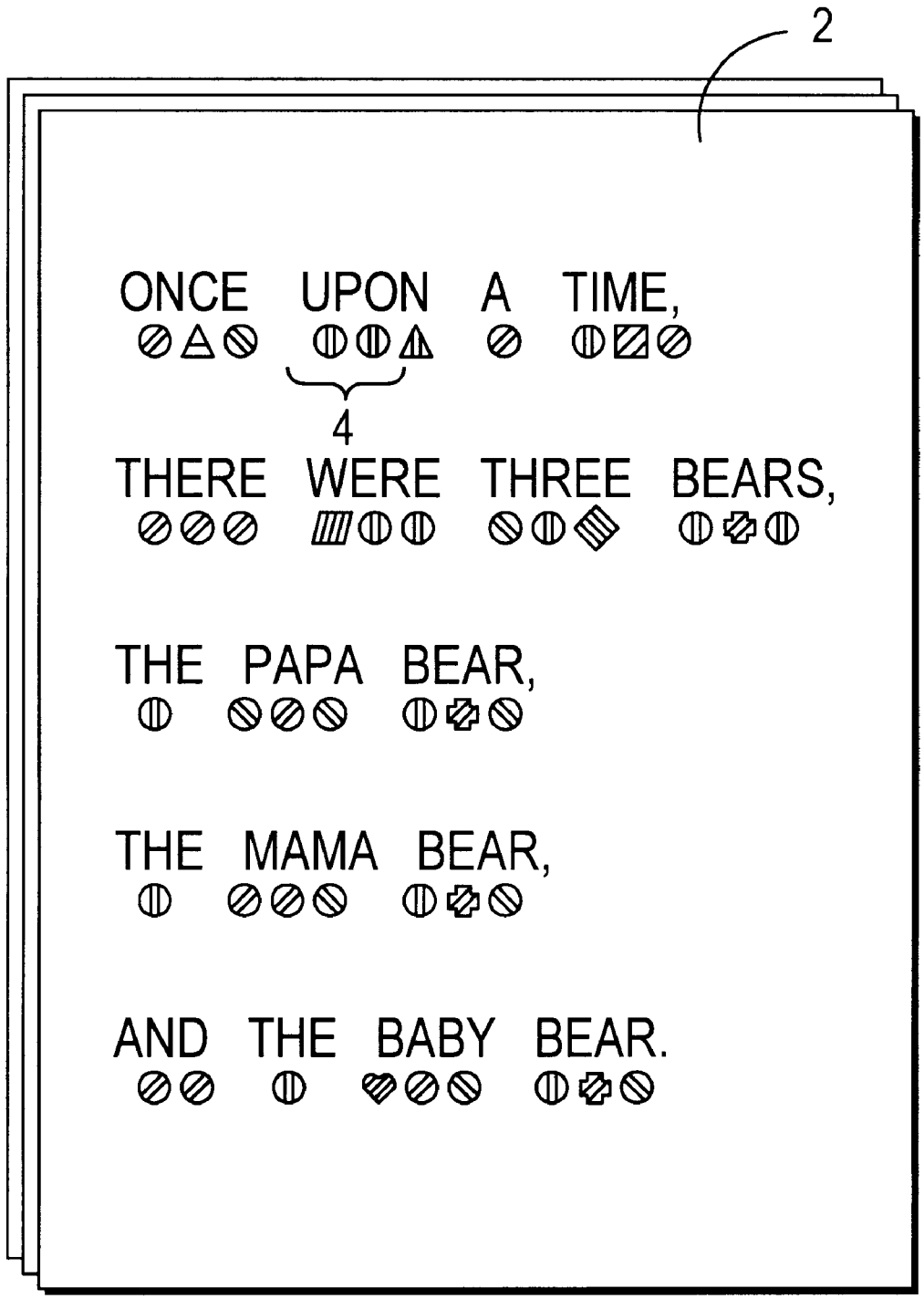
FIG. 2A shows a single page of a child's book in accordance with a second embodiment of the present invention.

To further increase the number of possible combinations, different geometric shapes such as, for example, triangles, squares, etc. may be employed in lieu of or in addition to the colored circles, as shown for example in FIG. 2A. Shading of the shapes may also be used to increase the number of possible combinations.

Alternatively, number sequences may be employed to uniquely identify each word and/or phrase. For example, the word "papa" could be represented by 112, and the word "bear" could be represented by 548, etc. However, circles or shapes may be more user friendly and more appealing to younger children and are therefore preferred. Rather than using shapes or numbers, other indicia such as, for example, cartoon characters may instead be used.

It is contemplated that the visual indicia may also be associated with other printed objects in the publications such as, for example, an alphabet, or a picture, with the reading tutor reciting the alphabet, explaining the picture, etc. when the appropriate code is selected.

Thus, this invention advantageously provides the author or editor an ability to designate all or selected portions of the book to have specific audible instructional and/or educational messages to the young reader by merely associating a unique visual indicia with the words or phrases in the selected portion of the book. It is expected that the young reader will find the audible messages entertaining and, consequently, will read the book with greater enthusiasm and, ultimately, without requiring the assistance of a teacher or parent.

Figure 1B:
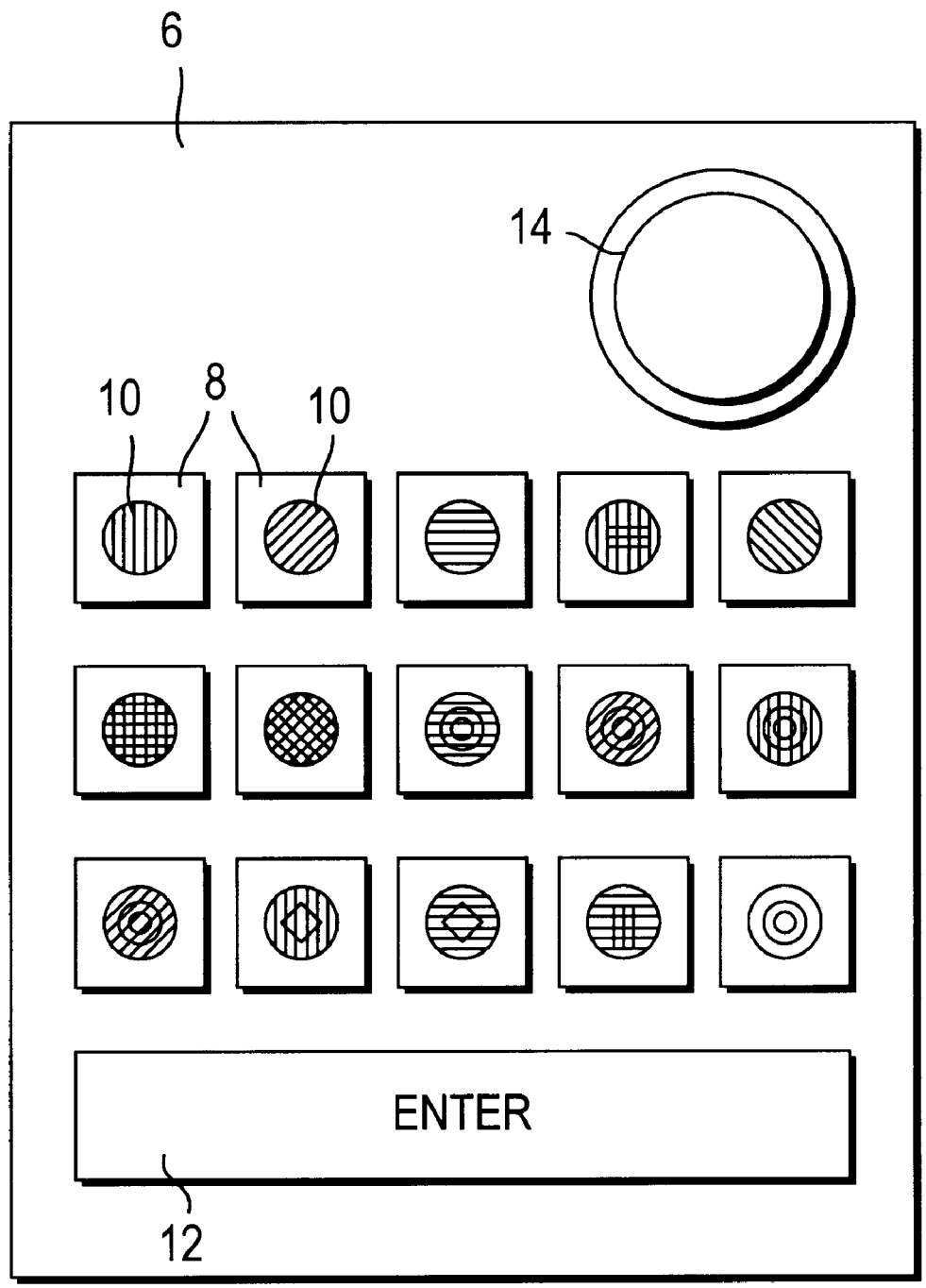
FIG. 1B schematically illustrates an electronic reading tutor constructed in accordance with the first embodiment of the present invention.

Shown in FIG. 1B is an exemplary electronic reading tutor 6 which, in the preferred embodiment, is separate from and not incorporated in the book 2. The reading tutor 6 has a plurality of touch-sensitive keys or switches 8, each key displaying a component color or shape of the visual indicia employed in the book of FIG. 1A. The reading tutor 6 also has a speaker 14.

Figure 2B:
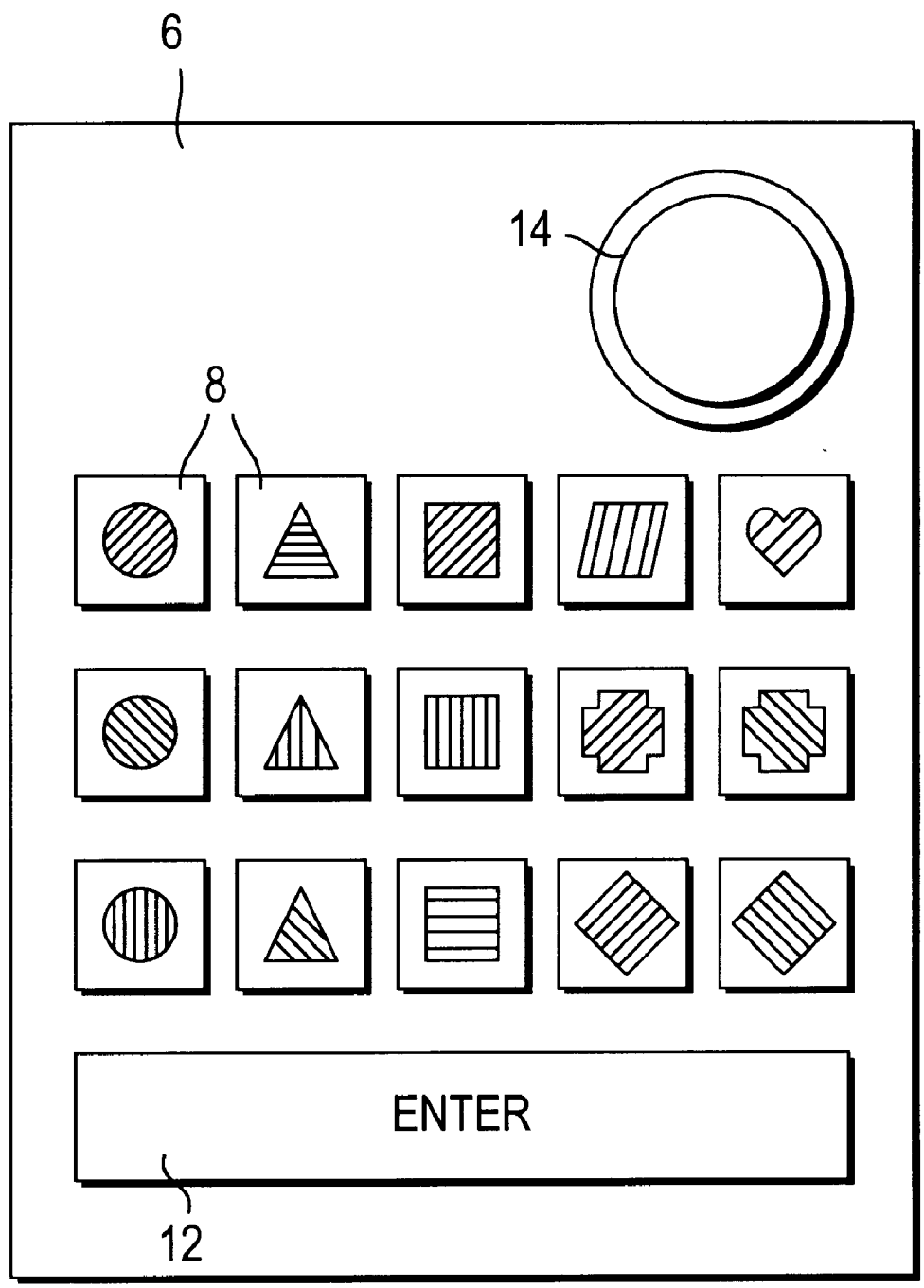
FIG. 2B schematically illustrates an electronic reading tutor constructed in accordance with the second embodiment of the present invention.

The embodiment shown in FIG. 1B displays circles with different shading patterns 10 on the keys 8. On the other hand, the keys in the embodiment of FIG. 2B show different geometric shapes with different shading patterns.

Figure 3:
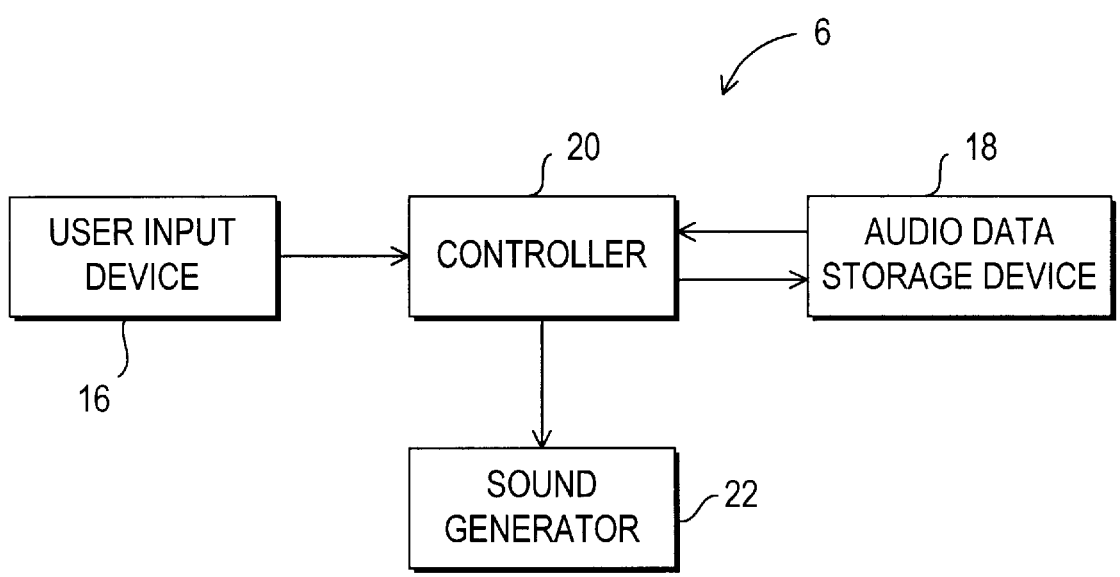
FIG. 3 is a block diagram schematically illustrating the electronic reading tutor of the present invention.

As schematically illustrated in FIG. 3, the electronic reading tutor 6 includes a user input device 16 comprising the plurality of touch-sensitive keys 8 for outputting a signal (e.g., a data string) indicative of the visual indicia selected by the reader, and an audio data storage device 18 for storing groups of data representing speech such as, for example, the sounds of a word, a phrase, recitations of an alphabet, and/or an explanatory message corresponding to the printed indicia in the book 2. The reading tutor 6 further includes a controller 20 for receiving the output signals from the user input device 16 indicative of the user-selected visual indicia and for retrieving from the audio data storage device 18 the data associated with the selected visual indicia. The controller 20 outputs the retrieved data to a sound generator 22 for converting the data into an audio signal representing sound. The sound generator 22 includes the speaker 14 for converting the audio signal into sound.

The controller 20 preferably includes one or more integrated circuits which compare the output signal or data string generated by the user input device 16 to a stored database in the audio data storage device 18 containing at least a list of the visual indicia, e.g., sequences of colored dots or shapes, used in the corresponding book. Preferably, in the database, each of the visual indicia used in the corresponding book is linked to a single audio signal file. Each audio signal file contains data representative of, for example, the word or phrase associated with the visual indicia, and which causes the speaker 14 to generate sound to simulate the speaking of such word or phrase. Thus, in response to a user's keyed data entry, the electronic reading tutor 6 enunciates the unrecognized word or phrase associated with the sequence of colored dots or shapes printed in the book 2. Alternatively, or additionally, the electronic reading tutor 6 will generate an audible message explaining the word, phrase or other selected portion of the book.

Based on the above disclosure, a person of ordinary skill can readily construct the electronic reading tutor 6 using any well known electronic means including, for example, a combination of hardware, firmware and/or software.

Figure 4:
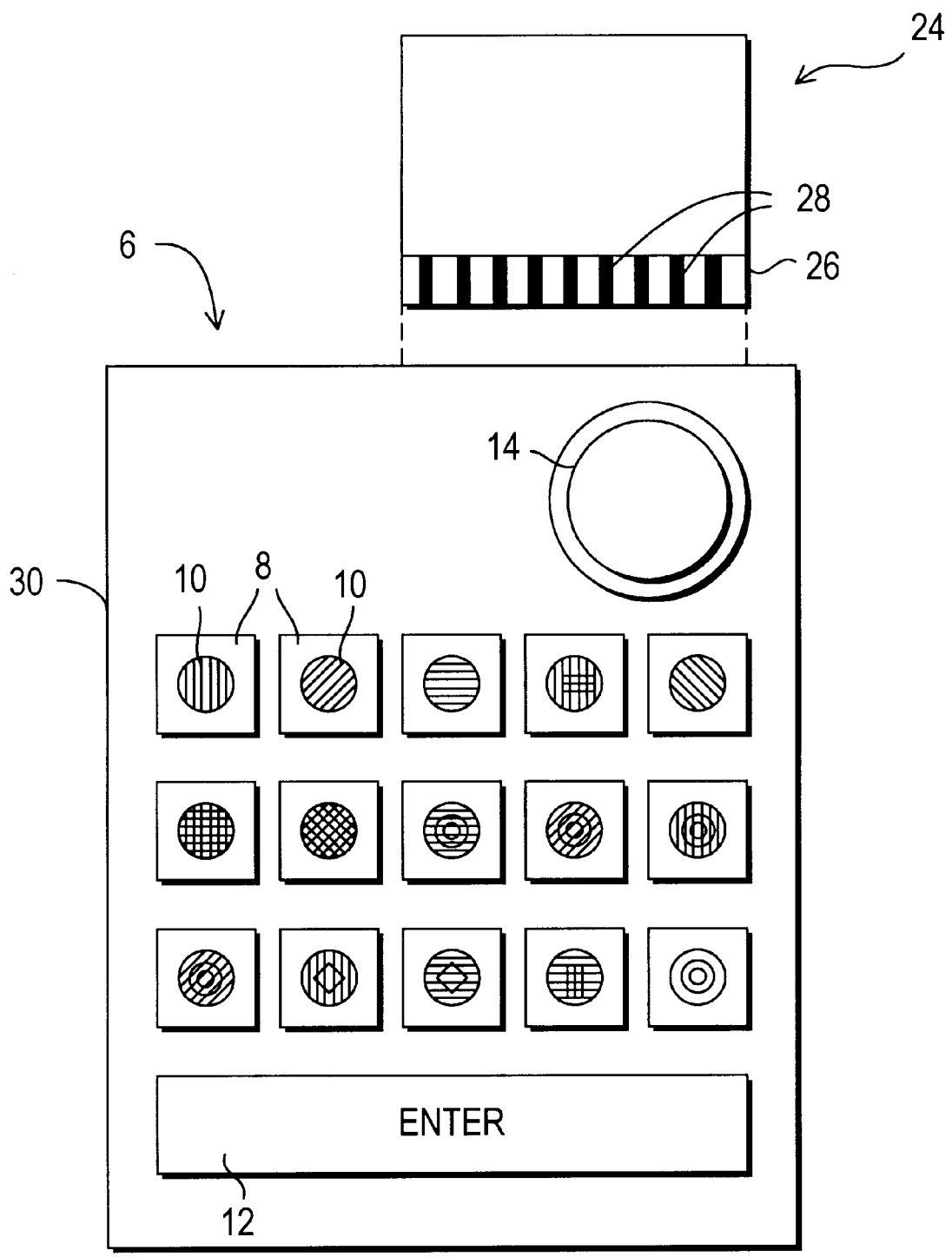
FIG. 4 depicts an electronic reading tutor and a programmable cartridge constructed in accordance with a third embodiment of the present invention.

FIG. 4 schematically illustrates another embodiment of the reading tutor 6 wherein the audio data storage device 18 is a user-insertable cartridge 24 configured to removably interface with the controller 20. Advantageously, a user may purchase one reading tutor which then may be used with any of a number of different cartridges, each corresponding to, for example, a different book. It is contemplated that each cartridge 24 may include an EEPROM having the requisite audio data for a corresponding book and a connector 26 having conductive traces 28 for mating with those of a corresponding connector (not shown) in the reading tutor housing 30. The cartridge 24 may also comprise other removable data storage device, such as a tape or CD-ROM in which event the reading tutor housing 30 would include a suitable mechanism for mating same.

In use, if a reader cannot recognize a word of the story or desires a verbal explanation of a select portion of the book 2, the user presses sequentially the keys 8 in accordance with the sequence of the colored circles 4 adjacent the unrecognized word appearing on the page of the book 2. After pressing the appropriate keys 8, the user presses the ENTER button 12 on the electronic reading tutor 6 to indicate that data entry has been completed. The reading tutor 6 then enunciates and/or verbally explains the unrecognized word as explained above.

It is contemplated that all of the words in the book 2 may have the same number of circles associated therewith. In such event, it would not be necessary for the electronic reading tutor 6 to have an "ENTER" key since pressing of the correct number of keys would be recognized as a completed data entry. As a further alternative, a lapse of a predetermined amount of time without further data entry may be recognized as a completion of data entry. In any event, in response to the reader's keyed data entry, the electronic reading tutor 6 generates an audible sound simulating the speaking of the unrecognized word or phrase associated with the group of colored dots or shapes printed in the book 2. Alternatively, or additionally, the electronic reading tutor 6 will generate a verbal message explaining the unrecognized word, phrase or other printed object, such as a picture.

It is further contemplated that the user input device 16 need not be a keypad but may instead be a touch-sensitive screen or any other suitable user-manipulable input device.

While there have been shown and described and pointed out fundamental novel features of the present invention as applied to a preferred embodiment thereof, it will be understood that various omissions and substitutions and changes in the methods described and in the form and details of the devices illustrated, and in their operation, may be made by those of ordinary skill in the art without departing from the spirit of the present invention. For example, it is expressly intended that all combinations of those elements and/or method steps which perform substantially the same function in substantially the same way to achieve substantially the same results are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. In combination, an apparatus for assisting a child to understand printed matter, comprising:

a printed matter having a plurality of printed objects and including a sequence of different symbols displayed adjacent to each of at least two of said plurality of printed objects for unique identification with each of said at least two of said plurality of printed objects; and an electronic tutor separate from and not operatively connectable with said printed matter, including:

a user input device comprising a plurality of touch-sensitive switches for manipulation by a user and for receiving a user command indicative of one of said plurality of printed objects, selected by a user each of said plurality of touch-sensitive switches having one of said symbols visibly and uniquely identified therewith, said user input device outputting a signal corresponding to said one of said plurality of printed objects selected by a user when said plurality of touch-sensitive switches are depressed sequentially in accordance with said sequence of symbols displayed adjacent to said one of said plurality of printed objects selected by a user;

a storage device for storing data representing speech associated with each of said at least two of said plurality of printed objects;

a controller, operatively connected to said user input device and said storage device, for selectively retrieving said data corresponding to said one of said plurality of printed objects selected by a user from said storage device in response to said signal outputted from said user input device; and a sound generator for converting said retrieved data into an audio signal representing speech.

2. The apparatus of claim 1, wherein said sound generator includes a speaker for converting the audio signal into sound.

3. The apparatus of claim 1, wherein said sequence of symbols includes at least two different colors in sequence, said user-input device having one of said at least two different colors visibly and uniquely identified with one of said plurality of touch-sensitive switches and another one of said at least two different colors visibly and uniquely identified with another of said plurality of touch-sensitive switches so that said user command is generated by user manipulation of said plurality of touch-sensitive switches in accordance with said sequence of said at least two different colors.

4. The apparatus of claim 1, wherein said sequence of symbols includes a number.

5. The apparatus of claim 1, wherein said sequence of symbols includes at least two different geometric shapes in sequence, said user-input device having one of said at least two different geometric shapes visibly and uniquely identified with one of said plurality of touch-sensitive switches and another one of said at least two different geometric shapes visibly and uniquely identified with another of said plurality of touch sensitive switches so that said user command is generated by user manipulation of said plurality of touch-sensitive switches in accordance with said sequence of said at least two different geometric shapes.

6. The apparatus of claim 1, wherein said printed matter is a book.

7. The apparatus of claim 6, wherein one of said plurality of printed objects is one of an alphabet, a word, a phrase, and a pictorial object.

8. The device of claim 1, wherein said storage device includes a user-insertable cartridge configured to removably interface with said controller.

9. The apparatus of claim 1, wherein each of said plurality of touch-sensitive switches has one of said symbols displayed thereon.

10. The apparatus of claim 1, wherein each of said plurality of touch-sensitive switches has one of said symbols displayed adjacent thereto.

11. A method for assisting a child to understand printed matter, comprising the steps of:

displaying a sequence of different symbols adjacent to each of at least two printed objects printed on a matter for unique identification with each of said at least two printed objects;

storing in a storage device data representing speech associated with said each of said at least two printed objects;

providing a user input device separate from and not operatively connectable with the printed matter, said user input device having a plurality of touch-sensitive switches for manipulation by a user, each of said plurality of touch-sensitive switches having one of said symbols visibly and uniquely identified therewith;

depressing sequentially said plurality of touch-sensitive switches in accordance with said unique sequence of different symbols printed adjacent one of said plurality of printed objects selected by a user so that said user input device generates a signal corresponding to said one of said plurality of printed objects selected by a user, and outputting form the storage device said stored data associated with said one of said plurality of printed objects selected by a user in response to said signal form said user input device.

12. The method of claim 11, further comprising the step of converting said date into sound.

13. The method of claim 11, wherein said displaying step includes displaying a sequence of at least one of colors and geometric shapes.

14. The method of claim 11, wherein one of said plurality of printed objects is at least one of words and pictures.

15. The method of claim 11, wherein said displaying step comprises printing a sequence of different symbols adjacent to each of at least two of said plurality of printed objects, each said sequence of different symbols uniquely identifying its respective printed object.

* * * * *